(12) United States Patent
Singamsetty et al.

(10) Patent No.: US 10,419,889 B2
(45) Date of Patent: Sep. 17, 2019

(54) INTEGRATING BUILDING AUTOMATION WITH LOCATION AWARENESS UTILIZING WIRELESS MESH TECHNOLOGY

(71) Applicant: WiSilica Inc., Laguna Hills, CA (US)

(72) Inventors: Suresh Singamsetty, Aliso Viejo, CA (US); Dennis Ching Chung Kwan, San Diego, CA (US); Francis Antony, Aluva (IN)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 16/222,841

(22) Filed: Dec. 17, 2018

(65) Prior Publication Data
US 2019/0141484 A1 May 9, 2019

Related U.S. Application Data

(63) Continuation of application No. 15/713,661, filed on Sep. 24, 2017, now Pat. No. 10,194,276.

(60) Provisional application No. 62/421,599, filed on Nov. 14, 2016.

(51) Int. Cl.
| H04W 4/029 | (2018.01) |
| H04W 4/70 | (2018.01) |
| H04W 88/16 | (2009.01) |
| H04L 29/08 | (2006.01) |
| H04W 84/18 | (2009.01) |
| H04W 4/80 | (2018.01) |
| H04W 4/33 | (2018.01) |

(52) U.S. Cl.
CPC ............ *H04W 4/029* (2018.02); *H04L 67/12* (2013.01); *H04W 4/33* (2018.02); *H04W 4/70* (2018.02); *H04W 4/80* (2018.02); *H04W 84/18* (2013.01); *H04W 88/16* (2013.01)

(58) Field of Classification Search
None
See application file for complete search history.

(56) References Cited

U.S. PATENT DOCUMENTS

| 8,964,708 | B2 | 2/2015 | Petite |
| 9,430,936 | B2 | 8/2016 | Petite |
| 9,491,571 | B2 | 11/2016 | Karp et al. |
| 9,924,342 | B2 * | 3/2018 | Logue .................. H04W 8/005 |

\* cited by examiner

*Primary Examiner* — K. Wong
(74) *Attorney, Agent, or Firm* — RowanTELS LLC (57) ABSTRACT

A system for providing location awareness in a building automation system includes a mesh network of lighting devices on a first floor of a building and a second mesh network of lighting devices on a second floor of the building each aggregating a tracking tag signals at a floor level gateway of the building automation system.

13 Claims, 8 Drawing Sheets

FIG. 8 ically:1015151515

INTEGRATING BUILDING AUTOMATION WITH LOCATION AWARENESS UTILIZING WIRELESS MESH TECHNOLOGY

CROSS-REFERENCE TO RELATED APPLICATIONS

This application is a continuation of U.S. application Ser. No. 15/713,661, filed on Sep. 24, 2017, which claims priority and benefit under 35 USC 119(e) to U.S. application Ser. No. 62/421,599, filed on Nov. 14, 2016, the contents of each being incorporated herein by reference in their entirety.

BACKGROUND

Assets (e.g. products, merchandise, people, etc.) often need to be tracked within buildings for a variety of reasons ranging from, but not limited to, maintaining premises security, managing inventory, or gauging productivity. In some cases such assets may become lost or stolen in which case it is currently difficult to effectively and efficiently determine the movement history and last known location of a particular asset.

Currently some buildings and complexes may try to solve the problem by implementing massive video surveillance systems to track assets. While these surveillance systems may constantly record activity they however may not be optimized for or able to identify critical events that require the attention of personnel. Thus such systems lead to wasted resources because in some instances hundreds of CTV feeds may have to be monitored at any time, which can cause low overall monitoring efficiency and quality. Further a lack of filtering for specific events over a video feed can lead to longer response times for security personnel in the event of a security issue.

In other instances some buildings and complexes may implement passive RFID or barcode tracking systems in order to track assets. However these systems are heavily dependent on the proper scanning of each item and its corresponding tag at various checkpoints through out the assets journey from point "A" to point "B". While such systems may able to tell when an item has left point "A" and arrived at point "B" they provide no awareness as to where the asset may be while it is traveling between said checkpoints.

While many buildings currently incorporate an array of systems for building automation and the monitoring of assets, there is still a great need for providing effective and efficient location awareness while tracking asset.

BRIEF SUMMARY OF THE INVENTION

The present invention solves the aforementioned problems by implementing a system for providing location awareness utilizing a wireless mesh network. Within such a network a tracking tag communicates tag data (e.g. RSSI, sensor reading, etc.) to a mesh node, which in turn further relays the tag data via a gateway, which further forwards the tag data to an application layer in a server.

Mesh nodes form a network autonomously to relay data using efficient routing schemes such as Leader Node Election Protocol so that tag data is efficiently routed. Multiple gateways may be deployed to provide redundant routes for tag data to be routed to the server. Further, a hop count limit is used to prevent data being routed beyond the typical number of hops required to reach a gateway, so that tag data within a region may be localized and not routed throughout the entire mesh network and create unnecessary traffic load.

Each mesh node receiving tag data also measures the receive signal strength and optionally also the direction and time difference of arrival of the data packets, and append a timestamp to each data packet received and then send to the server. Tag location information is calculated in the application layer in the server by collating data packets received from multiple mesh nodes based on timestamps and applying trilateration algorithms to such information together with the known locations of the mesh nodes.

This invention pertains in particular to the use of lighting devices being part of a building automation network, such as standard 2 feet-by-4 feet luminaires, to be used as mesh nodes as well as gateway devices. An example implementation of a gateway device is a luminaire powered by Power-over-Ethernet (PoE), where connectivity to the server is conveniently provided via the Ethernet connection.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Overview

Herein various embodiments of an asset tracking tag and system and method(s) of operating the tracking tag and system are disclosed. These embodiments may be operated within a mesh network environment using various wireless protocols and technologies, including those defined below.

Mesh Network

A mesh network is a type of machine communication system in which each client node (sender and receiver of data messages) of the network also relays data for the network. All client nodes cooperate in the distribution of data in the network. Mesh networks may in some cases also include designated router and gateway nodes (e.g., nodes that connect to an external network such as the Internet) that are or are not also client nodes. The nodes are often laptops, cell phones, or other wireless devices. The coverage area of the nodes working together as a mesh network is sometimes called a mesh cloud.

Mesh networks can relay messages using either a flooding technique or a routing technique. Flooding is a routing algorithm in which every incoming packet, unless addressed to the receiving node itself, is forwarded through every outgoing link of the receiving node, except the one it arrived on. With routing, the message is propagated through the network by hopping from node to node until it reaches its destination. To ensure that all its paths remain available, a mesh network may allow for continuous connections and may reconfigure itself around broken paths. In mesh networks there is often more than one path between a source and a destination node in the network. A mobile ad hoc network (MANET) is usually a type of mesh network. MANETs also allow the client nodes to be mobile.

A wireless mesh network (WMN) is a mesh network of radio nodes. Wireless mesh networks can self-form and self-heal and can be implemented with various wireless technologies and need not be restricted to any one technology or protocol. Each device in a mobile wireless mesh network is free to move, and will therefore change its routing links among the mesh nodes accordingly.

Mesh networks may be decentralized (with no central server) or centrally managed (with a central server). Both types may be reliable and resilient, as each node needs only transmit as far as the next node. Nodes act as routers to transmit data from nearby nodes to peers that are too far away to reach in a single hop, resulting in a network that can span larger distances. The topology of a mesh network is also reliable, as each node is connected to several other nodes. If one node drops out of the network, due to hardware failure or moving out of wireless range, its neighbors can quickly identify alternate routes using a routing protocol.

Building Automation Network

Figure 1:
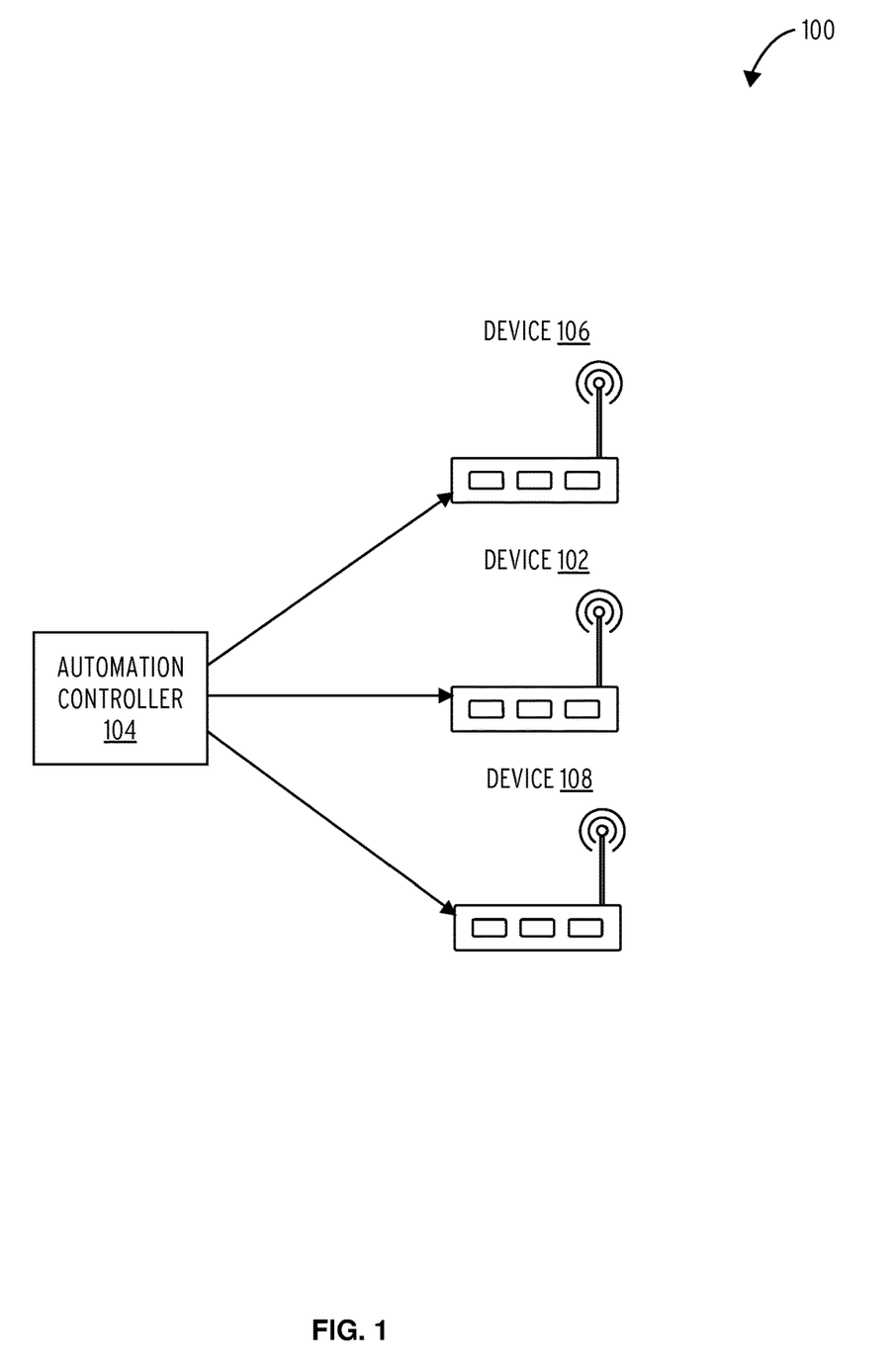
FIG. 1 illustrates an embodiment of a building automation and location awareness environment 100.

Referring to FIG. 1, a building automation and location awareness environment 100 comprises an automation controller 104 and building automation devices 102, 106, and 108. The automation controller 104 may be a combination of hardware and software that serves as a central manager of a building automation system. The automation controller 104 may be configured to control appliances (e.g. factory robots), control an indoor environment (e.g. lighting, heating, etc.), and track assets, among other tasks, within a building. The automation controller 104 may be hosted on a server and may be located on premises or off site. Further, the automation controller 104 may be networked with building automation devices 102, 106, 108 each of which may provide an access point for a mesh network. The building automation devices 102, 106, 108 may have a fixed location (e.g. a wall mounted wireless router) or may be mobile (e.g. a mobile phone or tablet).

Figure 2:
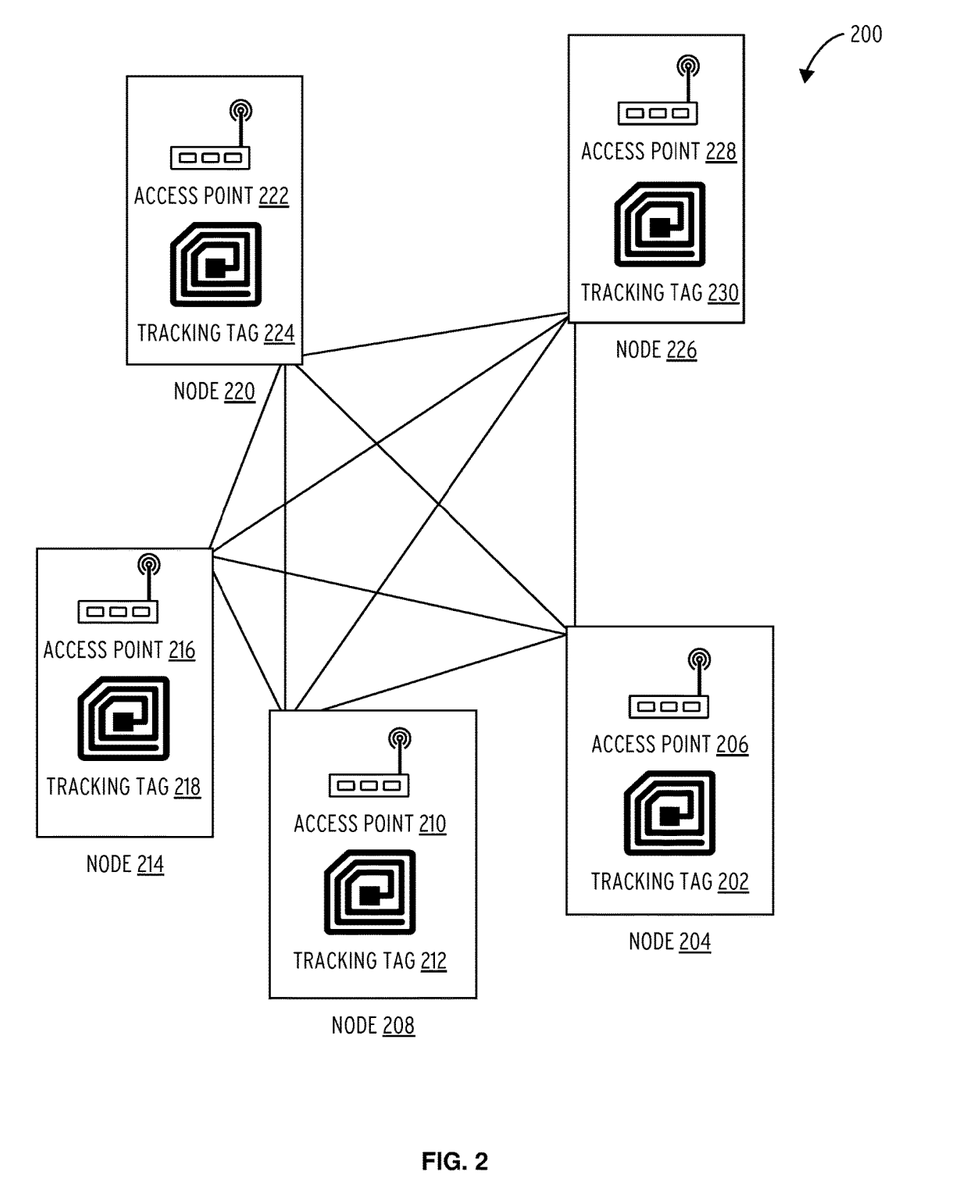
FIG. 2 illustrates an embodiment of a system 200 for integrating building automation with location awareness utilizing wireless mesh technology.
Figure 3:
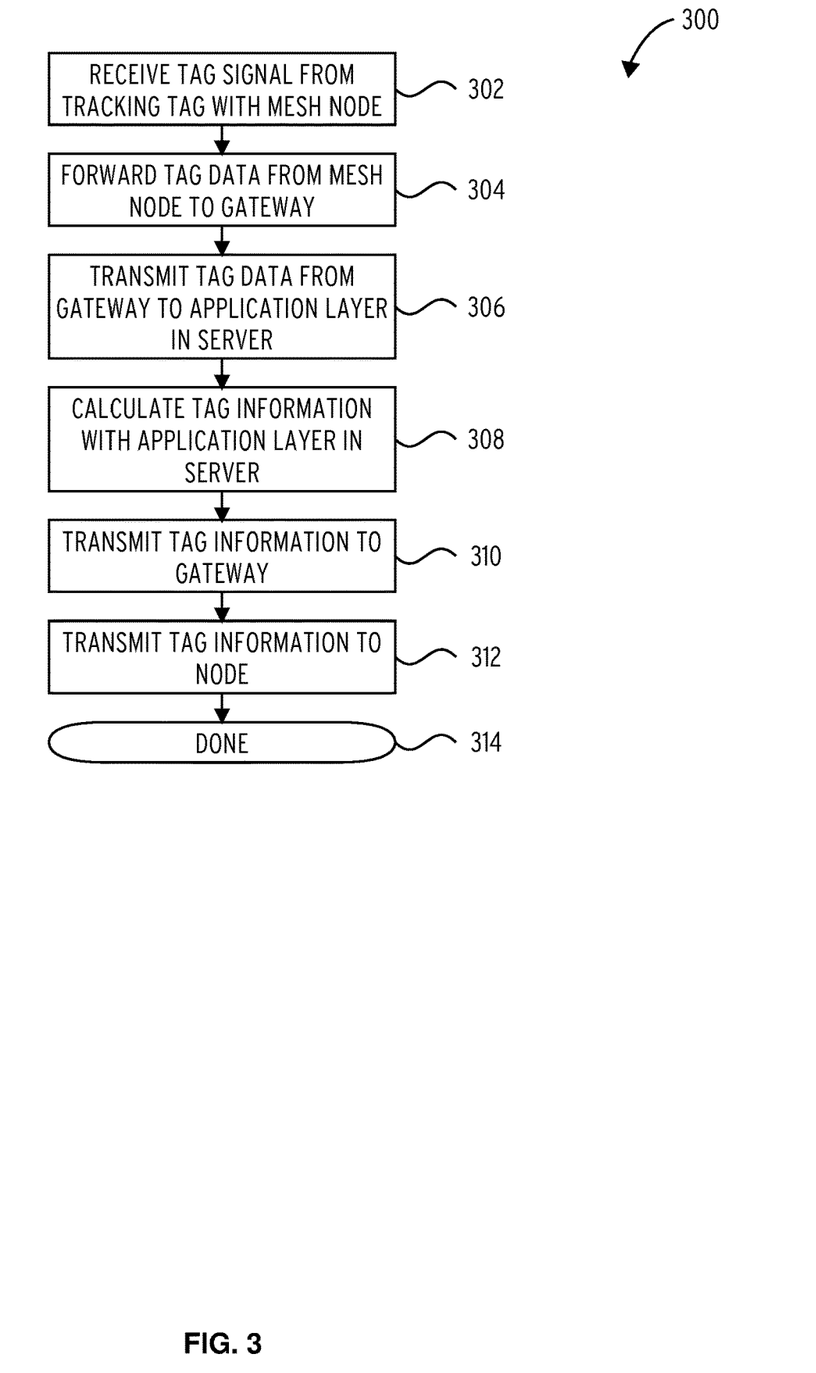
FIG. 3 illustrates an embodiment of a process 300 for utilizing integrated building automation wireless mesh technology with location awareness.

FIG. 2 illustrates an embodiment of a system 200 for integrating building automation with location awareness utilizing wireless mesh technology. The system 200 may be operated in accordance with the process 300. The system 200 comprises the node 220, the node 226, the node 204, the node 214, the node 208.

The node 220 comprises the tracking tag 224, and the access point 222. The node 226 comprises the access point 228 and the tracking tag 230. The node 204 comprises the tracking tag 202 and the access point 206. The node 208 comprises the access point 210 and the tracking tag 212. The node 214 comprises the access point 216 and the tracking tag 218. Each node is enabled to communicate via its respective access point and thus may be part of a mesh network that is reliable and resilient, as each node needs only transmit as far as the next node.

The system 200 may be established on an existing automation network, with each node within the network having an access point and a tracking tag. The high density of access points for assets allows tracking of nodes and tags to be more accurate.

The system 200 is vendor agnostic and utilizes building automation infrastructure to track assets within a building. In addition, smart phones can be used with beacons to locate themselves within the building. The devices may then act as access points for beacon data in conjunction with one-another allowing smartphones, assets, and devices all to be located with respect to one-another.

In order to be tracked and located, each "dumb" appliance in a facility needs a tag or module for the asset to be identifiable as a network node.

The nodes may be loaded with preset logic to activate a specific action on the "dumb" appliance it is attached to if a certain event occurs. For instance, if the appliance is carried outside of a designated area the node can tell the devices to sound an alarm.

This allows for integration with access control and surveillance which may greatly increase the efficiency of these systems by allowing for event-based tracking and alerts so that events may be prioritized and security may get automatically generated alerts, which is important for applications which are very sensitive to response time. This real-time location monitoring is also very useful for workflow optimization and monitoring as well as asset tracking to reduce lost inventory or un-locatable items.

Tag Information Transmission

FIG. 3 illustrates a process 300 for utilizing integrated building automation wireless mesh technology with location awareness. In block 302, the process 300 receives tag signal from a tracking tag with a mesh node. In block 304, process 300 forwards tag data from a mesh node to a gateway. In block 306, process 300 transmits tag data from a gateway to an application layer in a server. In block 308, process 300 calculates tag information with the application layer in the server. In block 310, process 300 transmits the tag information to the gateway. In block 312, process 300 transmits the tag information to the node. In done block 314, process 300 ends.

Figure 4:
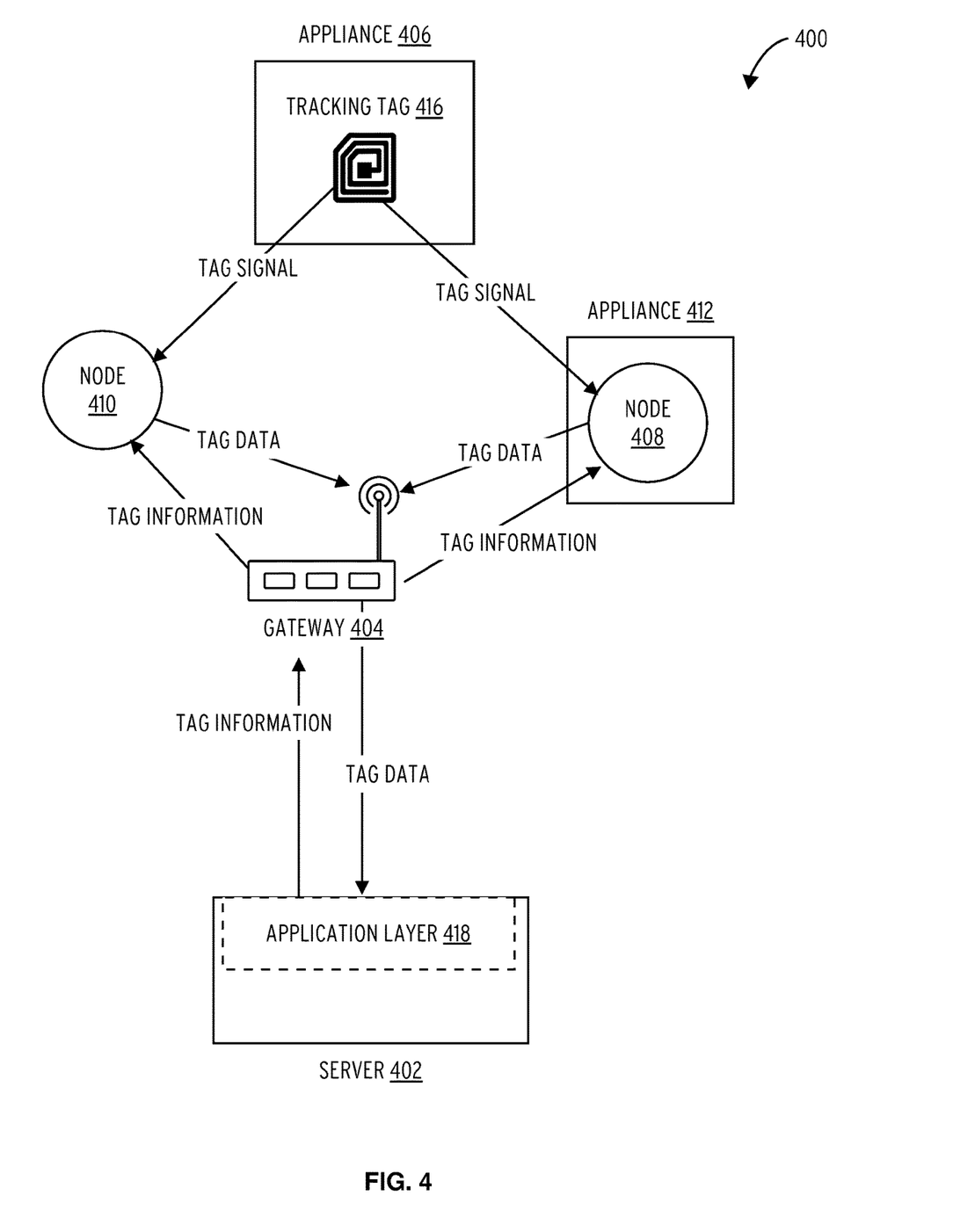
FIG. 4 illustrates an embodiment of a system 400 for integrating building automation with location awareness utilizing wireless mesh technology.

FIG. 4 illustrates an embodiment of a system 400 for integrating building automation with location awareness utilizing wireless mesh technology. The system 400 comprises a server 402, a gateway 404, an appliance 406, a node 408, a node 410, an appliance 412, a tracking tag 416, and an application layer 418.

The modules may be identified as nodes on the mesh network and receive information from the appliance it is attached to, and gather the temperature, data status and appliance status.

Each module may have controls to operate the dumb appliance it is attached to, to remotely control automation of the appliance and to read information from it. The module may control lighting color, temperature and brightness, heating and cooling, and may read moisture, carbon monoxide, smoke, humidity and other sensors.

The tracking tag 416 will be picked up by the nodes which will relay their relative location information to the central server 402. Central processor will aggregate all the information and calculate probable location of the tracking tag 416.

Figure 5:
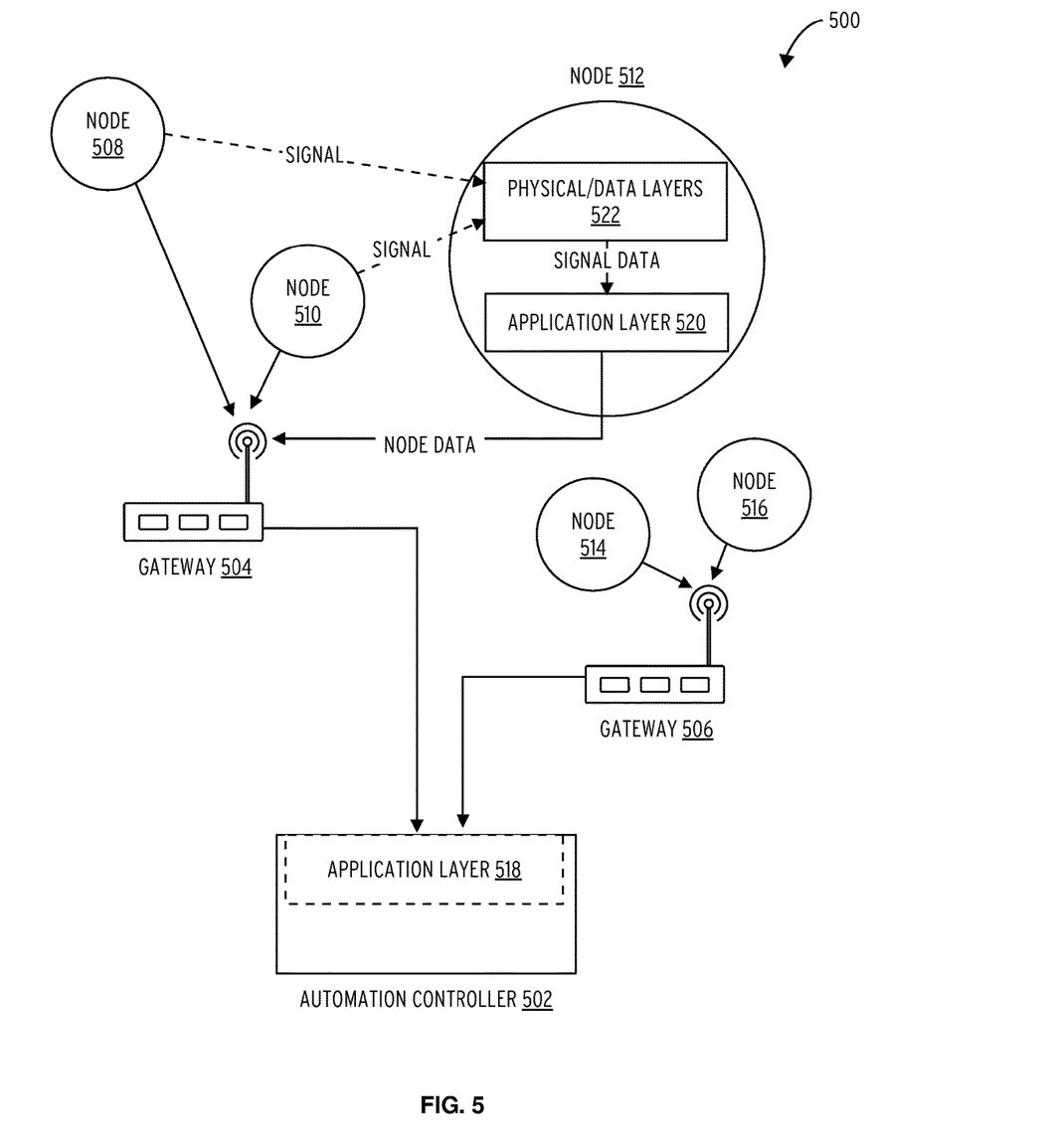
FIG. 5 illustrates an embodiment of a system 500 for integrating building automation with location awareness utilizing wireless mesh technology.

FIG. 5 illustrates an embodiment of a system 500 system for integrating building automation with location awareness utilizing wireless mesh technology. The system 500 comprises the node 508, the node 510, the node 512, the node 514, the node 516, the gateway 504, the gateway 506, the application layer 518 and the automation controller 502.

The node 512 comprises a physical/data layers 522 and an application layer 520.

Figure 6:
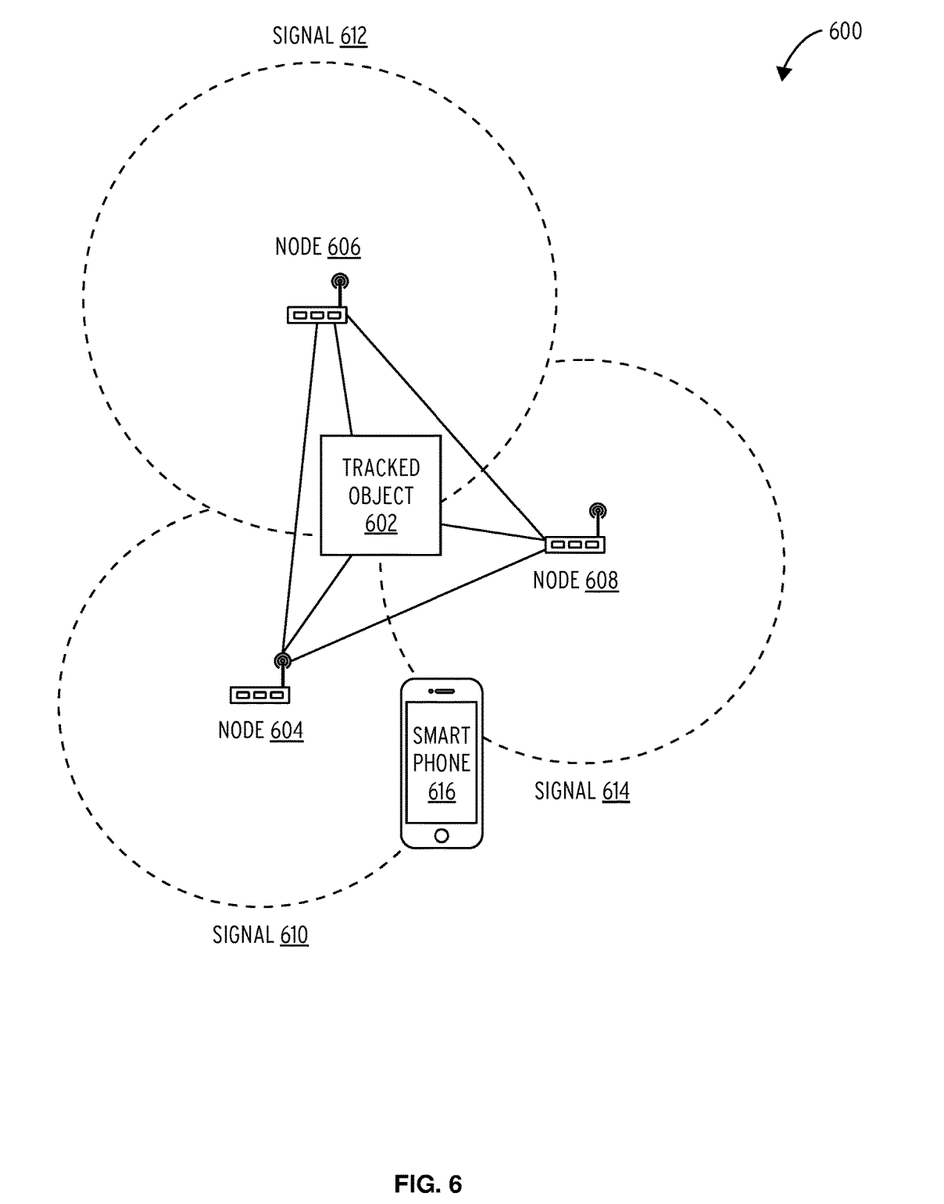
FIG. 6 illustrates an aspect of a system 600 for integrating building automation with location awareness utilizing wireless mesh technology

The node 512 receives signals from node 510 and node 508 at the physical/data layers 522. The physical/data layers 522 processes the signal data at the application layer 520 and may read the differences in signal strength to help determine the location of node 512 relative to node 510 and node 508. The node 512 transmits node data comprising node location, identification number and settings. The node 512, the node 510, and the node 508 communicate with the gateway 504. The node 514 and the node 516 communicate with the gateway 506. The gateway 506 and the gateway 504 pick up and aggregate data from their respective nodes and may determine relative location and signal strength. By utilizing tiered aggregation, this allows for learning at the cloud level.
Location Awareness FIG. 6 illustrates an embodiment of a system 600 for integrating building automation with location awareness utilizing wireless mesh technology. The system 600 comprises a tracked object 602, a node 604, a node 606, a node 608, a signal 610, a signal 612, a signal 614, and a smart phone 616.

Nodes listen to signals from other nodes and tags on the mesh network and relay that information to the gateway. The gateway may locate itself utilizing signal strength and signal angle of arrival (directional antenna) from the nodes and tags on the mesh network.

Figure 7:
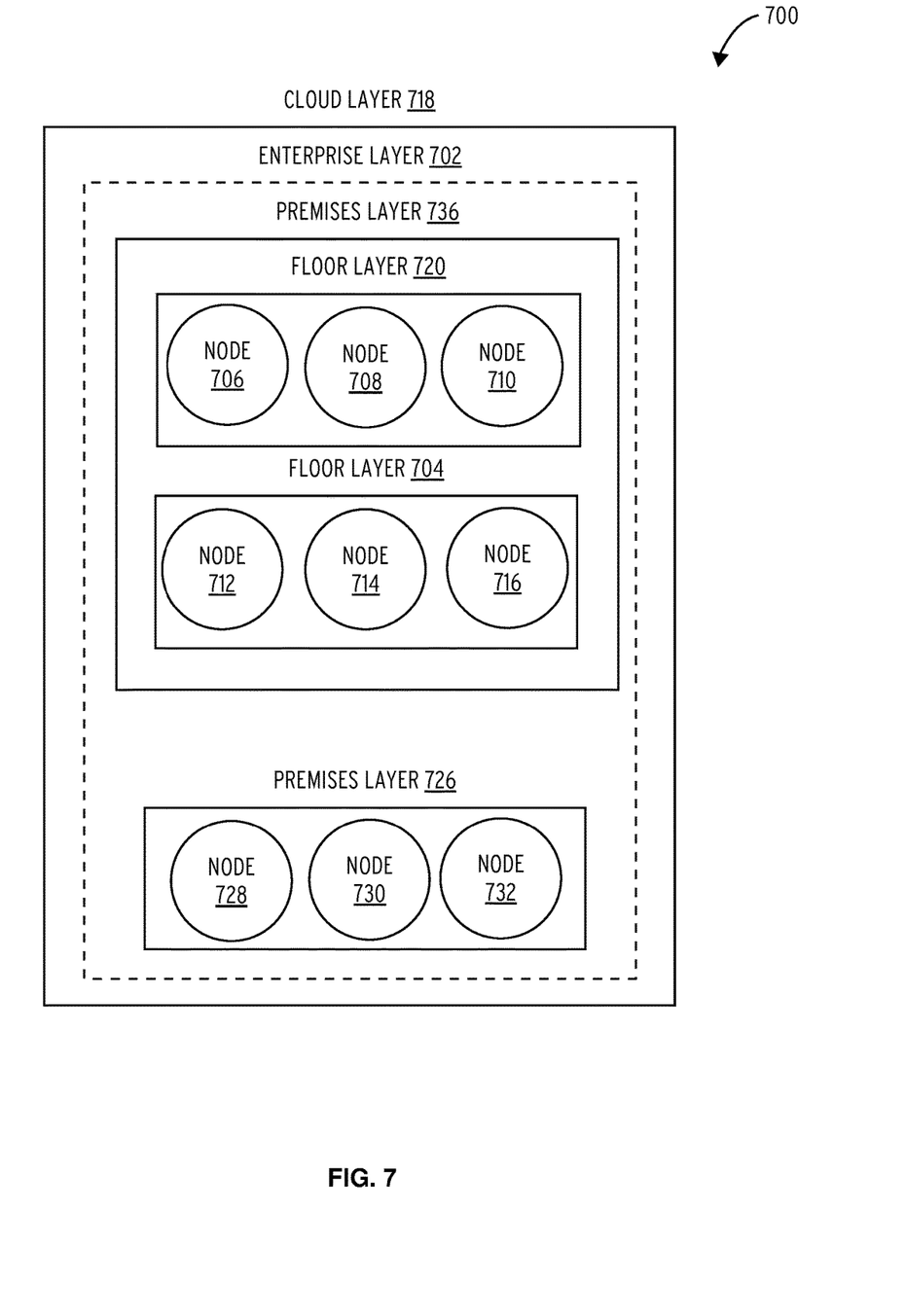
FIG. 7 illustrates an embodiment of a system 700 for integrating building automation with location awareness utilizing wireless mesh technology.

The node 606, node 608 or node 604 may be designated as "anchor nodes" may be to help efficiently determine location and identification of other tracked objects relative to themselves.
Aggregation Layers FIG. 7 illustrates an embodiment of a system 700 for integrating building automation with location awareness utilizing wireless mesh technology. The system 700 comprises a cloud layer 718. The cloud layer 718 comprises an enterprise layer 702. The enterprise layer 702 comprises a premises layer 726 and a premises layer 736. The premises layer 736 comprises the floor layer 720 and the floor layer 704. The floor layer 704 comprises a node 712, a node 714, and a node 716. The floor layer 720 comprises a node 706, a node 708, and a node 710. A premises layer 726, comprises a node 728, a node 730, and a node 732.

Figure 8:
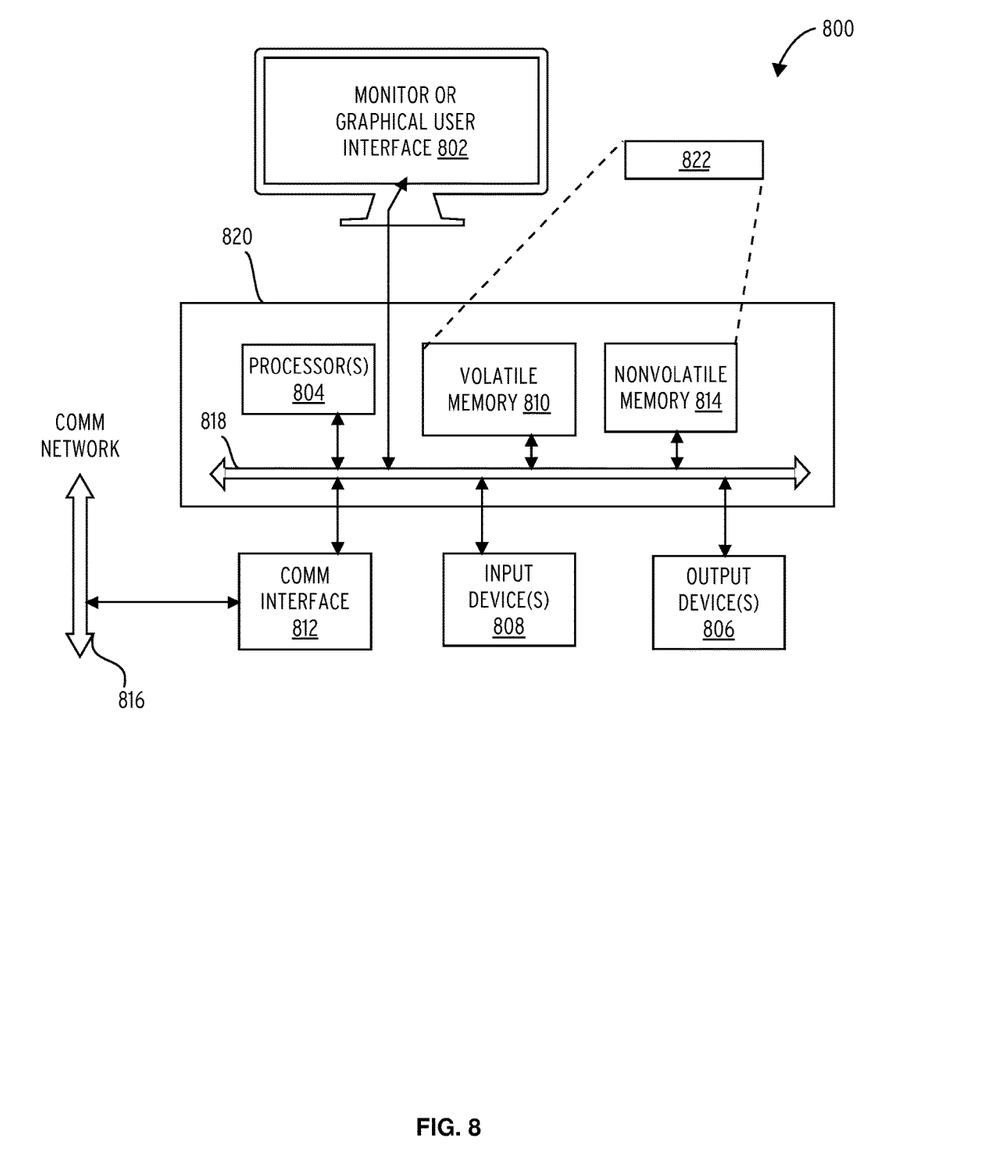
FIG. 8 is an example block diagram of a computing device 800 that may incorporate embodiments of the present invention.

The system 700 may aggregate data by aggregation layer, which may be based on the location of the node. For data from nodes within a multi-floor facility, data from nodes node 706, node 708, node 710 may be aggregated to floor layer 720. Data from node 714, node 712, and node 716 may be aggregated into floor layer 704. Data from floor layer 704 and floor layer 720 may be aggregated into premises layer 736 for the facility where the floors floor layer 704 and floor layer 720 are located. Data from node 728, node 730, and node 732 may be aggregated into premises layer 726 and premises layer 736 and premises layer 726 may be aggregated into an enterprise layer 702 which may be further aggregated into cloud layer 718.
Hardware FIG. 8 is an example block diagram of a computing device 800 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, the computing device 800 typically includes a monitor or graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as a volatile memory 810 and a nonvolatile memory 814.

The volatile memory 810 and/or the nonvolatile memory 814 may store computer-executable instructions and thus forming logic 822 that when applied to and executed by the processor(s) 804 implement embodiments of the processes disclosed herein.

The input device(s) 808 include devices and mechanisms for inputting information to the data processing system 820. These may include a keyboard, a keypad, a touch screen incorporated into the monitor or graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the monitor or graphical user interface 802 via a command such as a click of a button or the like.

The output device(s) 806 include devices and mechanisms for outputting information from the data processing system 820. These may include speakers, printers, infrared LEDs, and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like.

The computing device 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-onlymemories (ROMS), battery-backed volatile memories, networked storage devices, and the like. The volatile memory 810 and the nonvolatile memory 814 may be configured to store the basic programming and data constructs that provide the functionality of the disclosed processes and other embodiments thereof that fall within the scope of the present invention.

Logic 822 that implements embodiments of the present invention may be stored in the volatile memory 810 and/or the nonvolatile memory 814. Said software may be read from the volatile memory 810 and/or nonvolatile memory 814 and executed by the processor(s) 804. The volatile memory 810 and the nonvolatile memory 814 may also provide a repository for storing data used by the software.

The volatile memory 810 and the nonvolatile memory 814 may include a number of memories including a main random access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files. The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computing device 800 may be a mobile device such as a smartphone, a desktop computer, a laptop computer, a rack-mounted computer system, a computer server, or a tablet computer device. As commonly known in the art, the computing device 800 may be implemented as a collection of multiple networked computing devices. Further, the computing device 800 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Definitions

Various terminology is utilized herein, and should be assigned its conventional meaning in the relevant arts unless expressly defined herein.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Wireless Protocols

The system embodiments disclosed herein may utilize a variety of wireless communication technologies, including but not limited to the following:

"6LowPAN" in this context refers to an acronym of IPv6 (Internet Protocol Version 6) over Low power Wireless Personal Area Networks. It is a wireless standard for low-power radio communication applications that need wireless internet connectivity at lower data rates for devices with limited form factor. 6LoWPAN utilizes the RFC6282 standard for header compression and fragmentation. This protocol is used over a variety of networking media including Bluetooth Smart (2.4 GHz) or ZigBee or low-power RF (sub-1 GHz) and as such, the data rates and range may differ based on what networking media is used.

"Bluetooth Low-Energy (BLE)—or Bluetooth Smart" in this context refers to a wireless personal area network technology aimed at reduced power consumption and cost while maintaining a similar communication range as traditional Bluetooth. Like traditional Bluetooth, the frequency utilized is 2.4 GHz (ISM-Industrial, Scientific and Medical), the maximum range is generally 50-150 m with data rates up to 1 Mbps.

"Cellular" in this context refers to a communication network where the last link is wireless. The network is distributed over land areas called cells and utilizes one of the following standards GSM/GPRS/EDGE (2G), UMTS/HSPA (3G), LTE (4G). Frequencies are generally one of 900/1800/1900/2100 MHz. Ranges are 35 km max for GSM; 200 km max for HSPA and typical data download rates are: 35-170 kps (GPRS), 120-384 kbps (EDGE), 384 Kbps-2 Mbps (UMTS), 600 kbps-10 Mbps (HSPA), 3-10 Mbps (LTE).

"LoRaWAN" in this context refers to Low Power Wide Area Network, a media access control (MAC) protocol for wide area networks for low-cost, low-power, mobile, and secure bi-directional communication for large networks of up to millions of devices. LoRaWAN is employed on various frequencies, with a range of approximately 2-5 km (urban environment) to 15 km (suburban environment) and data rates of 0.3-50 kbps.

"NFC" in this context refers to "Near Field Communication" and is a subset of RFID (Radio Frequency Identifier) technology. NFC is standardized in ECMA-340 and ISO/IEC 18092. It employs electromagnetic induction between two loop antennae when NFC devices are within range (10 cm). NFC utilizes the frequency of 13.56 MHz (ISM). Data rates range from 106 to 424 kbit/s.

"SigFox" in this context refers to a cellular-style system that enables remote devices to connect using ultra-narrow band (UNB) technology and binary phase-shift keying (BPSK) to encode data. Utilizes the 900 MHz frequency and has a range of 30-50 km in rural environments and 3-10 km in urban environments with data rates from 10-1000 bps.

"Thread" in this context refers to a wireless mesh network standard that utilizes IEEE802.15.4 for the MAC (Media Access Control) and Physical layers, IETF IPv6 and 6LoWPAN (IVP6). Thread operates at 250 kbps in the 2.4 GHz band. The IEEE 802.15.4-2006 version of the specification is used for the Thread stack.

"Weightless" in this context refers to an open machine to machine protocol which spans the physical and mac layers. Operating frequency: 200 MHz to 1 GHz (900 MHz (ISM) 470-790 MHz (White Space)) Fractional bandwidth of spectrum band: <8% (for continuous tuning). Range up to 10 km and data Rates which range from a few bps up to 100 kbps "WiFi" in this context refers to a wireless network standard based on 802.11 family which consists of a series of half-duplex over-the-air modulation techniques that use the same basic protocol. Frequencies utilized include 2.4 GHz and 5 GHz bands with a range of approximately 50 m. Data rate of 600 Mbps maximum, but 150-200 Mbps is more typical, depending on channel frequency used and number of antennas (latest 802.11-ac standard should offer 500 Mbps to 1 Gbps).

"Z-Wave" in this context refers to a wireless standard for reliable, low-latency transmission of small data packets. The Z-Wave utilizes the Z-Wave Alliance ZAD12837/ITU-T G.9959 standards and operated over the 900 MHz frequency in the US (Part 15 unlicensed ISM) and is modulated by Manchester channel encoding. Z-Wave has a range of 30 m and data rates up to 100 kbit/s.

"ZigBee" in this context refers to a wireless networking standard for low power, low data rate, and lost cost applications. The Zigbee protocol builds upon the Institute of Electrical and Electronics Engineers (IEEE) 802.15.4 standard which defines a short range, low power, low data rate wireless interface for small devices that have constrained power, CPU, and memory resources. Zigbee operates over the 2.4 GHz frequency, with a range of 10-100 m and data rates of 250 kbps.

What is claimed is:

1. A method for providing location awareness in a building automation system, the method comprising:
    receiving a tag signal at a first plurality of nodes of a first mesh network of devices on a first floor of a building and aggregating the tag signal at a first floor level gateway of the building automation system;
    receiving the tag signal at a second plurality of nodes of a second mesh network of devices on a second floor of the building and aggregating the tag signal at a second floor level gateway of the building automation system;
    at a premise level gateway of the building, aggregating the tag signal aggregated by the first floor level gateway and the second floor level gateway into tag data, and communicating the tag data to a cloud server;
    wherein the cloud server processes the tag data to compute a tracking tag location and mobility; and
    wherein the tag location and mobility is distributed to the first plurality of nodes and the second plurality of nodes.

2. The method of claim 1, further comprising associating the tracking tag location with a floor level.

3. The method of claim 1, identifying the tracking tag location relative to one or more of a smartphone, tracked object, or device.

4. The method of claim 1, wherein the tracking tag location is associated with a control module on a device.

5. The method of claim 4, further comprising controlling the device remotely over one or both of the first mesh network and the second mesh network.

6. The method of claim 5, wherein the device is a lighting device.

7. The method of claim 5, further comprising controlling the device for one or more of lighting color, lighting brightness, and lighting temperature.

8. The method of claim 5, wherein at least one device of the first plurality of nodes or the second plurality of nodes is a mobile device.

9. The method of claim 1 wherein the first mesh network and the second mesh network conform to the Bluetooth Low Energy standard.

10. The method of claim 1 wherein the tracking tag is coupled with an object that is to be tracked.

11. The method of claim 1 where in the tag data comprises sensor readings collected in proximity to the tracking tag.

12. The method of claim 1 wherein a combination of a first node in first known location, a second node in a second known location, and a third node in a third known location of one or more of the floor levels triangulate the location of the tracking tag by computing a difference in RSSI values for the tag signal received at the first node, the second node, and the third node.

13. A system for providing location awareness in a building automation system, the system comprising:
    a first plurality of nodes of a first mesh network of lighting devices on a first floor of a building, the first plurality of nodes aggregating a tag signal at a first floor level gateway of the building automation system;
    a second plurality of nodes of a second mesh network of lighting devices on a second floor of the building, the second plurality of nodes aggregating the tag signal at a second floor level gateway of the building automation system;
    a premise level gateway of the building aggregating the tag signal aggregated by the first floor level gateway and the second floor level gateway into tag data and communicating the tag data to a cloud server that processes the tag data to compute a tracking tag location and mobility and initiates distribution of the tag location and mobility to the first plurality of nodes and the second plurality of nodes.

* * * * *